Aug. 2, 1955  R. L. HUFFMAN  2,714,427
LUBRICATING NOZZLE
Filed Feb. 13, 1952
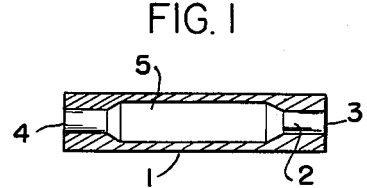
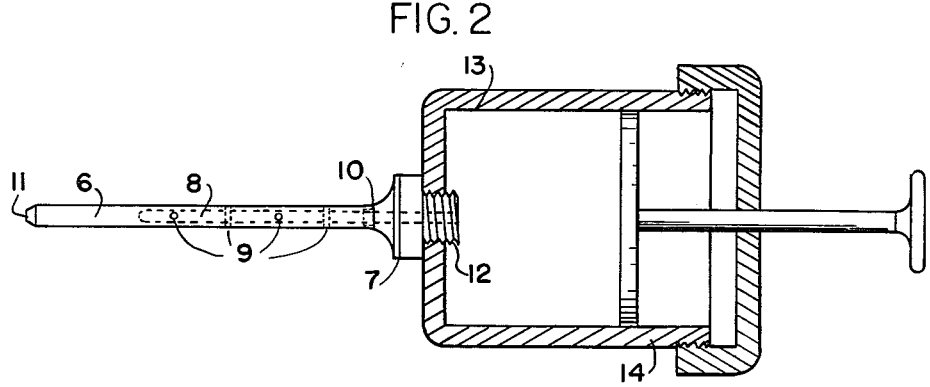
INVENTOR.
ROBERT L. HUFFMAN
BY
ATTY.

2,714,427

LUBRICATING NOZZLE

Robert L. Huffman, Chicago, Ill., assignor to Automatic Electric Laboratories, Inc., Chicago, Ill., a corporation of Delaware Application February 13, 1952, Serial No. 271,411

1 Claim. (Cl. 184—1)

This invention relates in general to nozzles and more specifically to fittings which are used on lubricating devices such as grease guns for injecting lubricant under pressure into small cavities.

The principal object of the invention is to provide a device for introduction of lubricant into lubricant retaining chambers and reservoirs. It is especially adapted for filling lubricant retaining chambers found within small dimensioned bearings used for various applications.

The particular object of the invention is to provide an instrument for introducing a lubricant into a retaining chamber in a bearing of the type described in Patent 2,540,688 issued February 6, 1951, to R. J. Novy (Figure 8). A cross-sectional view of that bearing is shown in Figure 1. This type of bearing is generally used in various types of rotary switches employed in the telephone art. The bearing forms the hub of a hub assembly upon which are mounted the wipers of a rotary switch as shown in Patent 2,522,715 issued September 19, 1950, to K. W. Graybill et al. designed for use as a support for the rotating element of a step-by-step switch such as the so-called rotary line switch used in automatic telephone systems. In this switch a fixed shaft carries a hub which rotates thereon, the hub supporting a set of spring wipers which make contact with different contacts in an arcuate contact bank as the wipers are rotated. The enlarged cavity in the bearing is partly filled with grease and then a shaft is inserted through it. The invention is described and illustrated in accordance with the accompanying drawing consisting of two figures on one sheet.

Figure 1 represents a cross-section view of a bearing having an internal lubricant reservoir.

Figure 2 represents the side view of the lubricating nozzle and cross-section view of a grease pump.

In the drawing, Figure 1 illustrates the cross-section of a bearing 1 previously mentioned. The bearing 1 possesses a narrow bore 2 with openings at 3 and 4 for admission of a shaft throughout its entire length. The larger bore 5 which is centrally located between the two openings, serves as a chamber for storage of lubricant that may be injected therein. After some lubricant is introduced into the chamber, a shaft is passed through the bearing and anchored by external means. The lubricant entrapped within the chamber engulfs the center section of the shaft and forms a film which is worked out during rotation to either end thus providing sufficient lubrication at the points of engagement of the shaft with the bearing.

Figure 2 shows the lubricating nozzle to be composed of two parts: an injector 6 and fitting 7.

The injector 6 is made from wear resisting material such as steel and consists of a tubular element the bore 8 of which is concentrically disposed about the longitudinal axis. The bore however, does not pass through the entire length of the injector but terminates in a closure near the penetrating end 11 of the injector. A series of openings 9 pass diametrically through the tubular portion of the injector, no two adjacent openings lying in the same longitudinal plane. The diameter of these openings may vary in size from any minimum to the maximum corresponding to the diameter of the bore. The mounting end of the injector is internally undercut so that it will engage the round extension of the fitting. These mating surfaces are shown at 10. The penetrating end 11 of the injector 6 is tapered to facilitate insertion into a bearing.

The fitting 7 made of wear resisting material consists of an element possessing a bore passing through its entire length and concentrically located with respect to its central axis. The diameter of this bore need not necessarily correspond dimensionally to the bore located within the injector. The attaching end 12 of the fitting may be tapped, threaded (as shown in Figure 2), or other means of engagement provided for attaching it to a chamber 13 containing a lubricant. The chamber may be a component of a device used for lubricating purposes such as the grease gun 14 shown in Figure 2.

The injector 6 and the fitting 7 are assembled together by forcing the surface of the undercut portion of the injector over the surface of the extension on the fitting thus obtaining the desirable press-fit. These mating surfaces are shown at 10. Above example illustrates only one of the many ways of attachment that may be resorted to in combining the two elements together. If practical, the entire assembly may be an integral unit formed by a molding or machining process.

After the attaching end 12 of the fitting 7 has been secured to the chamber 13 containing a lubricant, the injector 6 is inserted into one opening of the bearing such as 3 until the penetrating end 11 extends beyond the second opening such as 4. Pressure then is applied to the lubricant in chamber 13 so as to force the lubricant axially through the bore within the nozzle and then transversely out through the openings 9 in the injector into the reservoir 5. It is to be added that there is sufficient clearance existing between the injector and the bearing to allow the escape of entrapped air during the filling operation. After the reservoir space existing between the inserted nozzle and the bearing wall has been filled, the nozzle is withdrawn leaving the shaft bore of the bearing substantially free of grease or lubricant which is usually sufficiently stiff or non flowing to remain in its deposited state and not be pushed out by the insertion of the shaft (not shown) into the lubricant-free bore of the bearing.

While there has been described what is at present considered to be the preferred embodiment of the invention it will be understood that various modifications may be made therein without departing from the invention.

Having described my invention, what I consider to be new and desire to have protected by Letters Patent will be pointed out in the appended claim.

What is claimed is:

A lubricating device for use with a bearing having two ends of equal diameter forming bearing surfaces on either side of a central cavity, said central cavity having a larger diameter than said ends, said device comprising a nozzle of the same diameter throughout its length and terminating in a closure at one end and adapted to protrude through the length of said bearing, perforations in said nozzle longitudinally disposed along that portion of said nozzle which is enclosed by said central cavity, means for introducing under pressure a lubricating substance into said nozzle through its open end to be expelled through said perforations into said central cavity when the nozzle is inserted into said bearing, said nozzle being of such a diameter as to contact only said end bearing surfaces and form a tight fit with each surface to thereby prevent the introduction of said lubricating substance to said bearing surfaces.

References Cited in the file of this patent

UNITED STATES PATENTS

| | | | |
|---|---|---|---|
| 207,551 | Rodgers | Aug. 27, | 1878 |
| 392,844 | Best | Nov. 13, | 1888 |
| 1,155,848 | Tyrell | Oct. 5, | 1915 |
| 1,192,596 | Albrecht | July 25, | 1916 |
| 2,160,214 | Jackson | May 30, | 1939 |

FOREIGN PATENTS

| | | |
|---|---|---|
| 16,045 | Great Britain | 1887 |